(12) United States Patent
Li et al.

(10) Patent No.: US 10,591,778 B2
(45) Date of Patent: Mar. 17, 2020

(54) DISPLAY PANEL AND MANUFACTURING METHOD THEREOF

(71) Applicant: SHENZHEN CHINA STAR OPTOELECTRONICS TECHNOLOGY CO., LTD, Guangdong (CN)

(72) Inventors: Xiang Li, Guangdong (CN);
Chung-Ching Hsieh, Guangdong (CN);
Yanjun Song, Guangdong (CN);
Yongchao Zhao, Guangdong (CN);
Rentang Zhao, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 14 days.

(21) Appl. No.: 14/771,655

(22) PCT Filed: May 22, 2015

(86) PCT No.: PCT/CN2015/079569
§ 371 (c)(1),
(2) Date: Aug. 31, 2015

(87) PCT Pub. No.: WO2016/169088
PCT Pub. Date: Oct. 27, 2016

(65) Prior Publication Data
US 2018/0039109 A1 Feb. 8, 2018

(30) Foreign Application Priority Data
Apr. 24, 2015 (CN) .......................... 2015 1 0198002

(51) Int. Cl.
G02F 1/1337 (2006.01)
G02F 1/1333 (2006.01)

(52) U.S. Cl.
CPC ...................... *G02F 1/1337* (2013.01); *G02F 2001/133354* (2013.01); *G02F 2001/133773* (2013.01)

(58) Field of Classification Search
CPC ... G02F 2001/133773; G02F 1/133788; G02F 1/13378; G02F 1/1337
See application file for complete search history.

(56) References Cited

U.S. PATENT DOCUMENTS

2007/0154653 A1    7/2007  Sawatari et al.
2007/0232780 A1*  10/2007  Tamura .................. C08G 73/10
                                                                528/310
(Continued)

FOREIGN PATENT DOCUMENTS

CN         1910509 A    2/2007
CN       202351590 U    7/2012
(Continued)

*Primary Examiner* — Jessica M Merlin
(74) *Attorney, Agent, or Firm* — Mark M. Friedman

(57) ABSTRACT

The present invention discloses a display panel and a manufacturing method thereof. A thin film transistor array substrate of a display panel is provided with a first alignment layer; a color filter substrate of display panel is provided with a second alignment layer; the first alignment layer is formed by irradiating the first alignment material with a first light having a first wavelength, the second alignment layer is formed by irradiating the second alignment material with a second light having a second wavelength. The present invention permits the display panel to have good reliability and high contrast as well.

12 Claims, 2 Drawing Sheets

(56) References Cited

U.S. PATENT DOCUMENTS

| | | | |
|---|---|---|---|
| 2009/0142865 A1 | 6/2009 | Sawatari et al. | |
| 2014/0063410 A1 | 3/2014 | Yu et al. | |
| 2014/0198271 A1* | 7/2014 | Kizu | G02F 1/1337 |
| | | | 349/15 |

FOREIGN PATENT DOCUMENTS

| | | | |
|---|---|---|---|
| CN | 103513468 A | | 1/2014 |
| CN | 104503149 A | * | 4/2015 |
| TW | 201409137 A | | 3/2014 |

* cited by examiner

DISPLAY PANEL AND MANUFACTURING METHOD THEREOF

BACKGROUND OF THE INVENTION

1. Field of the Invention

The present invention relates to the field of display technology, and particularly relates to a display panel and a method for manufacturing the display panel.

2. Description of the Related Art

The conventional photo-alignment technology is a non-contact alignment technique, which makes the alignment film change into anisotropic from originally isotropic via a photochemical reaction by irradiating the alignment layer with a light of a certain direction, therefore, the liquid crystal molecules can be aligned. Because the photo-alignment technique almost aligns the whole area of the surface of the alignment layer in a direction, the failure from the rubbing alignment method is avoided, and the bad failure from the alignment from the local irregularities of the friction fabric is avoided, the light leakage is reduced, and contrast is increased.

However, in the conventional photo-alignment technique, the alignment layers in the upper and lower substrates of the liquid crystal display panel are formed by using light to irradiate the alignment layer of the same kind material, which can cause the reliability of the liquid crystal display panel to be poor or the contrast of the liquid crystal display panel to be low, wherein whether good reliability is represented by image sticking parameter (ISP).

That is, the liquid crystal display panel formed by conventional photo-alignment technology cannot have good reliability and high contrast as well.

Therefore, it is necessary to provide a new technical solution to solve the technical problems.

SUMMARY OF THE INVENTION

The object of the present invention is to provide a display panel and a manufacturing method thereof, which can allow the display panel to have good reliability and high contrast as well.

To solve aforementioned problems, the technical solutions of the present invention are as follows:

A display panel, wherein the display panel comprises: a thin film transistor array substrate, which includes a first surface and a second surface, a first alignment layer located on the second surface, the first alignment layer including a first alignment material; a color filter substrate, the color filter substrate laminated to and integrally combined with the thin film transistor array substrate, the color filter substrate including a third surface and a fourth surface, the second surface provided opposite to the third surface, a second alignment layer provided on the third surface, the second alignment layer including a second alignment material; and a liquid crystal layer, which is provided between the second surface and the third surface; wherein the first alignment layer is formed by irradiating the first alignment material with a first light having a first wavelength of the first alignment material, the second alignment layer is formed by irradiating the second alignment material with a second light having a second wavelength; the first alignment material is one of a light-induced decomposing reaction alignment material, a light-induced isomerizing reaction alignment material, a light-induced crosslinking reaction alignment material; the second alignment material is one of a light-induced decomposing reaction alignment material, a light-induced isomerizing reaction alignment material, a light-induced crosslinking reaction alignment material; in a case that the alignment material is a light-induced decomposing reaction alignment material, the wavelength of the light irradiating the alignment material is 254 nm; in a case that the alignment material is a light-induced isomerizing reaction alignment material, the wavelength of the light irradiating the alignment material is 365 nm or 313 nm; wherein the alignment material is the first or the second alignment material.

In the aforementioned display panel, the wavelength of the first light is equal to the wavelength of the second light.

In the aforementioned display panel, the wavelength of the first light is in the range of 252 nm to 256 nm, the wavelength of the second light is in the range of 311 nm to 315 nm.

In the aforementioned display panel, the wavelength of the first light is in the range of 252 nm to 256 nm, the wavelength of the second light is in the range of 363 nm to 367 nm.

In the aforementioned display panel, the wavelength of the second light is in the range of 252 nm to 256 nm, the wavelength of the first light is in the range of 311 nm to 315 nm.

In the aforementioned display panel, the wavelength of the second light is in the range of 252 nm to 256 nm, the wavelength of the first light is in the range of 363 nm to 367 nm.

A display panel, wherein the display panel comprises: a thin film transistor array substrate, which includes a first surface and a second surface, a first alignment layer located on the second surface, the first alignment layer including a first alignment material; a color filter substrate, the color filter substrate laminated to and integrally combined with the thin film transistor array substrate, the color filter substrate including a third surface and a fourth surface, the second surface provided opposite to the third surface, a second alignment layer provided on the third surface, the second alignment layer including a second alignment material; and a liquid crystal layer, which is provided between the second surface and the third surface; wherein the first alignment layer is formed by irradiating the first alignment material with a first light having a first wavelength of the first alignment material, the second alignment layer is formed by irradiating the second alignment material with a second light having a second wavelength.

In the aforementioned display panel, the first alignment material is one of a light-induced decomposing reaction alignment material, a light-induced isomerizing reaction alignment material, a light-induced crosslinking reaction alignment material; the second alignment material is one of a light-induced decomposing reaction alignment material, a light-induced isomerizing reaction alignment material, a light-induced crosslinking reaction alignment material.

In the aforementioned display panel, the wavelength of the first light is equal to the wavelength of the second light.

In the aforementioned display panel, the wavelength of the first light is in the range of 252 nm to 256 nm, the wavelength of the second light is in the range of 311 nm to 315 nm.

In the aforementioned display panel, the wavelength of the first light is in the range of 252 nm to 256 nm, the wavelength of the second light is in the range of 363 nm to 367 nm.

In the aforementioned display panel, the wavelength of the second light is in the range of 252 nm to 256 nm, the wavelength of the first light is in the range of 311 nm to 315 nm.

In the aforementioned display panel, the wavelength of the second light is in the range of 252 nm to 256 nm, the wavelength of the first light is in the range of 363 nm to 367 nm.

A method for manufacturing the display panel, wherein the method comprises the steps of: A, irradiating the first alignment material with a first light having a first wavelength of the first alignment material to form the first alignment layer on the second surface of the thin film transistor array substrate; B, irradiating the second alignment material with a second light having a second wavelength to form the second alignment layer on the third surface of the color filter substrate; C, combining and laminating the thin film transistor array substrate with the first alignment layer located and the color filter substrate with the second alignment layer located as a whole part; D, disposing the liquid crystal layer between the second surface of the thin film transistor array substrate and the third surface of the color filter substrate.

In the method for manufacturing the display panel, the first alignment material is one of a light-induced decomposing reaction alignment material, a light-induced isomerizing reaction alignment material, a light-induced crosslinking reaction alignment material; the second alignment material is another one of a light-induced decomposing reaction alignment material, a light-induced isomerizing reaction alignment material, a light-induced crosslinking reaction alignment material.

In the method for manufacturing the display panel, the wavelength of the first light is equal to the wavelength of the second light.

In the method for manufacturing the display panel, the wavelength of the first light is in the range of 252 nm to 256 nm; the wavelength of the second light is in the range of 311 nm to 315 nm.

In the method for manufacturing the display panel, the wavelength of the first light is in the range of 252 nm to 256 nm; the wavelength of the second light is in the range of 363 nm to 367 nm.

In the method for manufacturing the display panel, the wavelength of the second light is in the range of 252 nm to 256 nm, the wavelength of the first light is in the range of 311 nm to 315 nm.

In the method for manufacturing the display panel, the wavelength of the second light is in the range of 252 nm to 256 nm, the wavelength of the first light is in the range of 363 nm to 367 nm.

Compared with the prior art, the present invention can allow the display panel to have good reliability and high contrast as well.

To allow the above present invention to be more clearly comprehensible, preferred embodiments, accompanied with the drawings, are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

As used in this specification the term "embodiment" means an instance, example, or illustration. In addition, with regard to the articles in this specification and the appended claims, use of "a" in general can be interpreted as "one or more" unless specified otherwise or clear from context to determine the singular form.

Figure 1:
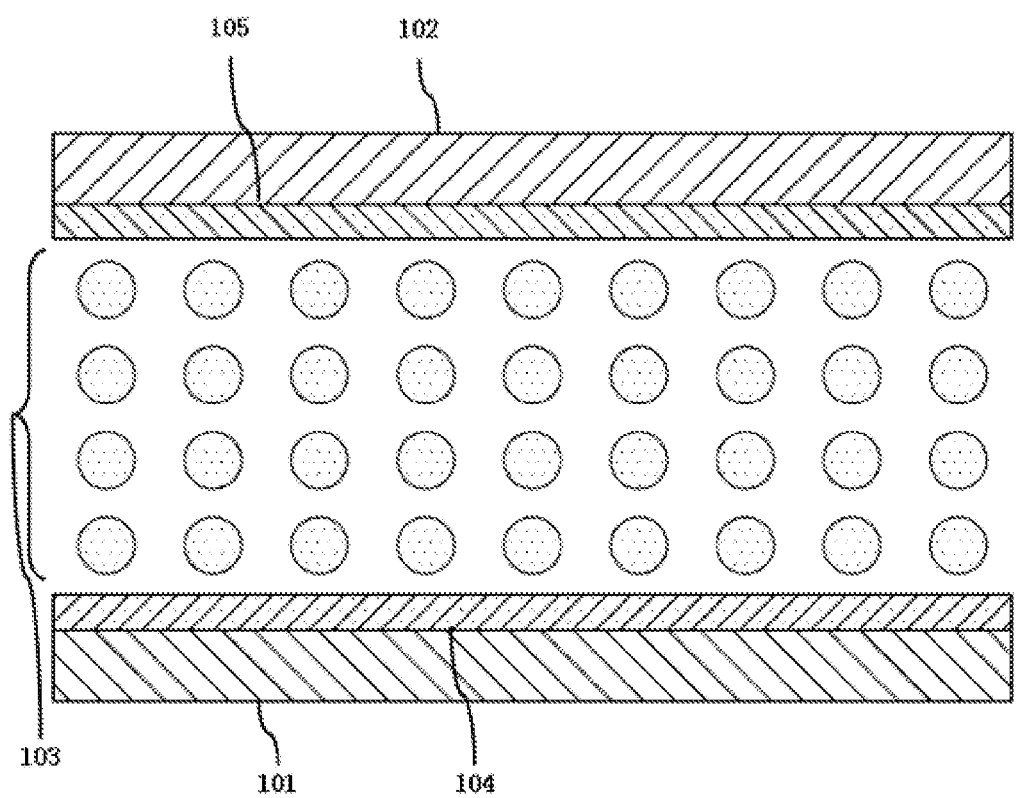
FIG. 1 is a diagram of a display panel according to the first embodiment of the present invention.

Refer to FIG. 1, which is a diagram of a display panel according to the first embodiment of the present invention.

In the present embodiment, the display panel includes a thin film transistor array substrate 101, a color filter substrate 102, and a liquid crystal layer 103. The color filter substrate 102 is laminated to and integrally combined with the thin film transistor array substrate 101.

The thin film transistor array substrate 101 includes a first surface and a second surface; a first alignment layer 104 is located on the second surface, and the first alignment layer 104 includes a first alignment material.

The color filter substrate 102 includes a third surface and a fourth surface; the second surface is provided opposite to the third surface, a second alignment layer 105 is provided on the third surface, and the second alignment layer 105 includes a second alignment material.

Figure 2:
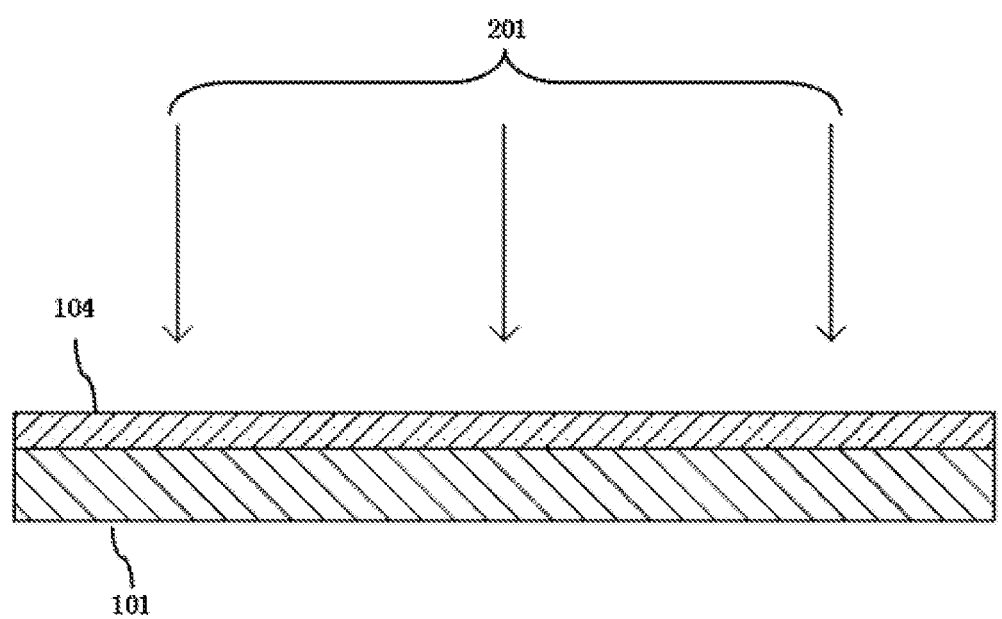
FIG. 2 is a diagram of a first alignment layer formed by irradiating the first alignment material with a first light having a first wavelength of the first alignment material.

The liquid crystal layer 103 is provided between the second surface and the third surface.

Wherein the first alignment layer 104 is formed by using a first light 201 having a first wavelength to irradiate the first alignment material, as shown in FIG. 2. The second alignment layer 105 is formed by irradiating the second alignment material with a second light having a second wavelength.

The second embodiment of the display panel of the present invention is similar to the first embodiment described above, the differences are below:

In this embodiment, the first alignment material is one of a light-induced decomposing reaction alignment material, a light-induced isomerizing reaction alignment material, a light-induced crosslinking reaction alignment material.

The second alignment material is one of a light-induced decomposing reaction alignment material, a light-induced isomerizing reaction alignment material, a light-induced crosslinking reaction alignment material.

In the case that the alignment material (the first alignment material or the second alignment material) is a light-induced decomposition material, when using a UV light to irradiate the material, a decomposition reaction happens in the polymer chain of the alignment material parallel to the polarization direction of the UV light in the alignment material, but the direction of the polymer chain of the alignment material perpendicular to the polarization direction is not changed; the alignment material then becomes anisotropic.

The anisotropic value of the alignment layer (the first alignment layer 104 or the second alignment layer 105) formed by the light-induced decomposition reaction alignment material irradiated by the UV light is greater, and the alignment material has good alignment capability, thus makes the display panel have a high contrast.

In the case that the alignment material (the first alignment material or the second alignment material) is a light-induced isomerizing reaction material, when using the UV light to irradiate the material, the light reactive group in the alignment material parallel to the polarization direction of the UV light in the alignment material will change from trans-configuration into cis-configuration, and continue to become a trans-configuration perpendicular to the original direction, then the alignment material becomes anisotropic.

The alignment layer (the first alignment layer 104 or the second alignment layer 105) formed by the light-induced isomerizing reaction alignment material irradiated by the UV light has better reliability.

In the case that the alignment material (the first alignment material or the second alignment material) is a light-induced crosslinking reaction material, under the irradiation of the linear polarization light (UV light), the dimerization addition polymerization chain reaction (2+2) happens in the alignment material, thus anisotropic distribution appears on the surface of the thin film of the polymer.

Similarly, the alignment layer (the first alignment layer 104 or the second alignment layer 105) formed by the light-induced crosslinking reaction alignment material irradiated by the UV light has better reliability.

Accordingly, the aforementioned solution allows the display panel to have better reliability and higher contrast as well.

In this embodiment, the wavelength of the first light is equal to the wavelength of the second light.

The third embodiment of the display panel of the present invention is similar to the second embodiment, the differences are:

In this embodiment, the wavelength of the first light is not equal to the wavelength of the second light.

For example, the first wavelength of light is in the range of 252 nm to 256 nm, the wavelength of the second light is in the range of 311 nm to 315 nm, or the wavelength of the second light is in the range of 363 nm to 367 nm.

Alternatively, the wavelength of the second light is in the range of 252 nm to 256 nm, the wavelength of the first light is in the range of 311 nm to 315 nm, or the wavelength of the first light is in the range of 363 nm to 367 nm.

The fourth embodiment of the display panel of the present invention is similar to the third embodiment, the differences are:

In this embodiment, the wavelength of the first light is 254 nm, the wavelength of the second light is 313 nm or 365 nm.

Alternatively, the wavelength of the second light is 254 nm, the wavelength of the first light is 313 nm or 365 nm.

In case that the alignment material (the first alignment material or the second alignment material) is a light-induced decomposition reaction alignment material, the material is irradiated with a light having a wavelength of 254 nm.

In case that the alignment material (the first alignment material or the second alignment material) is the light-induced isomerizing reaction alignment material, the material is irradiated with a light having a wavelength of 365 nm or 313 nm.

As an improvement, the light-induced isomerizing reaction alignment material is matched with the heat-crosslinked polymer layer, so as to largely improve the reliability of the display panel. The light-induced isomerizing reaction alignment material is matched with the heat-crosslinked polymer layer by mixing a reactive monomer into the liquid crystal molecules of the liquid crystal layer 103, and then irradiated with UV light.

Figure 3:
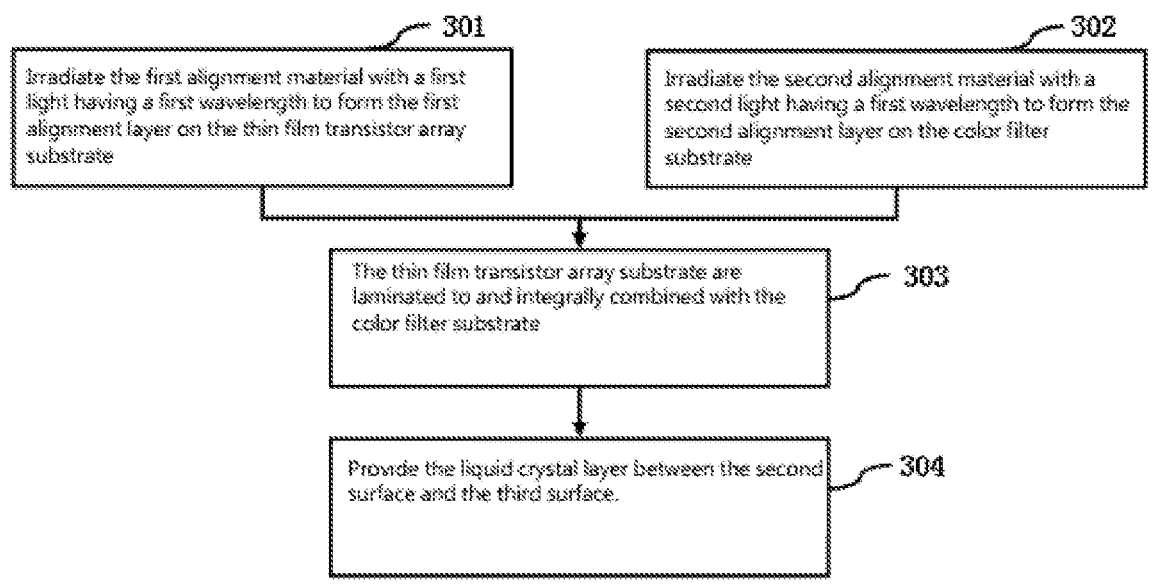
FIG. 3 is a flowchart of a method for manufacturing the display panel according to the first embodiment of the present invention.

Refer to FIG. 3, which is a flowchart of a method for manufacturing the display panel according to the first embodiment of the present invention.

In this embodiment, the method comprises the following steps:

A (step 301) irradiating the first alignment material with a first light having a first wavelength of the first alignment material 201 to form the first alignment layer 104 on the second surface of the thin film transistor array substrate 101, as shown in FIG. 2;

B (step 302), irradiating the second alignment material with a second light having a second wavelength to form the second alignment layer 105 on the third surface of the color filter substrate 102;

C (step 303), combining and laminating the thin film transistor array substrate 101 with the first alignment layer 104 located and the color filter substrate 102 with the second alignment layer 105 located as a whole part;

D (step 304), disposing the liquid crystal layer 103 between the second surface of the thin film transistor array substrate 101 and the third surface of the color filter substrate 102.

The second embodiment of the method for manufacturing the display panel of the present invention is similar to the first embodiment described above, the differences are:

In this embodiment, the first alignment material is one of a light-induced decomposing reaction alignment material, a light-induced isomerizing reaction alignment material, a light-induced crosslinking reaction alignment material.

The second alignment material is another one of a light-induced decomposing reaction alignment material, a light-induced isomerizing reaction alignment material, a light-induced crosslinking reaction alignment material.

In the case that the alignment material (the first alignment material or the second alignment material) is a light-induced decomposition material, when using the UV light to irradiate the material, a decomposition reaction happens in the polymer chain of the alignment material parallel to the polarization direction of the UV light in the alignment material, but the direction of the polymer chain of the alignment material perpendicular to the polarization direction is not changed; the alignment material then becomes anisotropic.

The anisotropic value of the alignment layer (the first alignment layer 104 or the second alignment layer 105) formed by the light-induced decomposition reaction alignment material irradiated by the UV light is greater, and the alignment material has good alignment capabilities, thus makes the display panel have a high contrast.

In the case that the alignment material (the first alignment material or the second alignment material) is a light-induced isomerizing reaction material, when using the UV light to irradiate the material, the light reactive group in the alignment material parallel to the polarization direction of the UV light in the alignment material will change from the trans-configuration into cis-configuration, and continue to become a trans-configuration perpendicular to the original direction, then the alignment material becomes anisotropic.

The alignment layer (the first alignment layer 104 or the second alignment layer 105) formed by the light-induced isomerizing reaction alignment material irradiated by the UV light has better reliability.

In the case that the alignment material (the first alignment material or the second alignment material) is a light-induced crosslinking reaction material, under the irradiation of the linear polarization light (UV light), the dimerization addition polymerization chain reaction (2+2) happens in the alignment material, thus anisotropic distribution appears on the surface of the thin film of the polymer.

Similarly, the alignment layer (the first alignment layer 104 or the second alignment layer 105) formed by the light-induced crosslinking reaction alignment material irradiated by the UV light has better reliability.

Accordingly, the aforementioned solution allows the display panel to have better reliability and higher contrast as well.

In this embodiment, the wavelength of the first light is equal to the wavelength of the second light.

The third embodiment of the method for manufacturing the display panel of the present invention is similar to the second embodiment, the differences are:

In this embodiment, the wavelength of the first light is not equal to the wavelength of the second light.

For example, the first wavelength of light is in the range of 252 nm to 256 nm, the wavelength of the second light is in the range of 311 nm to 315 nm, or the wavelength of the second light is in the range of 363 nm to 367 nm.

Alternatively, the wavelength of the second light is in the range of 252 nm to 256 nm, the wavelength of the first light is in the range of 311 nm to 315 nm, or the wavelength of the first light is in the range of 363 nm to 367 nm.

The fourth embodiment of the display panel of the present invention is similar to the third embodiment, the differences are:

In this embodiment, the wavelength of the first light is 254 nm, the wavelength of the second light is 313 nm or 365 nm;

Alternatively, the wavelength of the second light is 254 nm, the wavelength of the first light is 313 nm or 365 nm.

In case that the alignment material (the first alignment material or the second alignment material) is a light-induced decomposition reaction alignment material, the material is irradiated with a light having a wavelength of 254 nm.

In case that the alignment material (the first alignment material or the second alignment material) is the light-induced isomerizing reaction alignment material, the material is irradiated with a light having a wavelength of 365 nm or 313 nm.

As an improvement, the light-induced isomerizing reaction alignment material is matched with the heat-crosslinked polymer layer, so as to largely improve the reliability of the display panel. The light-induced isomerizing reaction alignment material is matched with the heat-crosslinked polymer layer by mixing a reactive monomer into the liquid crystal molecules of the liquid crystal layer 103, and then irradiating with UV light.

Despite being relative to one or more implementations shown and described the present invention, those skilled in the art would expect equivalent variations and modifications based upon reading and understanding the specification and drawings of the present invention. The present invention includes all such modifications and variations, and is only limited by the scope of the appended claims. Particularly with regard to the various functions performed by the above-described components, the terms used to describe such elements are intended to perform the function corresponding to the specified element (e.g., which is functionally equivalent) to any member (unless otherwise indicated), even in the structure of the functional implementation and execution of exemplary shown herein are disclosed in this specification structure is not the same. In addition, although a particular feature of this specification has a number of implementations with respect to only one being open, but this feature can be given and as may be or specific applications is a desirable and advantageous other implementations or more Other combinations of features. Furthermore, the terms "comprising", "having", "containing", or variations thereof as used in the detailed description or the claims are intended to be used in a manner similar to the term "comprising".

In summary, although the present invention has been described in the preferred embodiments above, the preferred embodiments are not intended to limit the invention. One of ordinary skill in the art without departing from the spirit and scope of the invention may be used for a variety modifications and variations, so the scope of the scope is defined by the claims.

What is claimed is:

1. A display panel, comprising:
    a thin film transistor array substrate, which includes a first surface and a second surface, and a first alignment layer located on the second surface of the thin film transistor array substrate, the first alignment layer including a first alignment material;
    a color filter substrate, laminated to and integrally combined with the thin film transistor array substrate, the color filter substrate including a first surface and a second surface, the first surface of the color filter substrate is opposite to the second surface of the thin film transistor array substrate, a second alignment layer provided on the first surface of the color filter substrate, the second alignment layer including a second alignment material; and
    a liquid crystal layer provided between the second surface of the thin film transistor array substrate and the first surface of the color filter substrate;
    wherein the first alignment material is one of a light-induced decomposing reaction alignment material, a light-induced isomerizing reaction alignment material, and a light-induced crosslinking reaction alignment material;
    wherein if the first alignment material is the light-induced decomposing reaction alignment material, the second alignment material is selected from the light-induced isomerizing reaction alignment material and the light-induced crosslinking reaction alignment material; if the first alignment material is the light-induced isomerizing reaction alignment material, the second alignment material is selected from the light-induced decomposing reaction alignment material and the light-induced crosslinking reaction alignment material; and if the first alignment material is the light-induced crosslinking reaction alignment material, the second alignment material is selected from the light-induced decomposing reaction alignment material and the light-induced isomerizing reaction alignment material;
    wherein a first portion of the first alignment material that is parallel to a polarization direction of a first light having a first wavelength is selectively alterable under irradiation of the first light from being parallel to the polarization direction of the first light to being perpendicular to the polarization direction of the first light, while a second portion of the first alignment material that is perpendicular to the polarization direction is not changed; and
    wherein a first portion of the second alignment material that is parallel to a polarization direction of a second light having a second wavelength is selectively alterable under irradiation of the second light from being parallel to the polarization direction of the second light to being perpendicular to the polarization direction of the second light, while a second portion of the second alignment material that is perpendicular to the polarization direction is not changed.

2. The display panel of claim 1, wherein the wavelength of the first light is equal to the wavelength of the second light.

3. The display panel of claim 1, wherein the wavelength of the first light is in a range of 252 nm to 256 nm, and the wavelength of the second light is in a range of 311 nm to 315 nm.

4. The display panel of claim 1, wherein the wavelength of the first light is in the range of 252 nm to 56 nm, the wavelength of the second light is in the range of 363 nm to 367 nm.

5. The display panel of claim 1, wherein the wavelength of the second light is in the range of 252 nm to 256 nm, the wavelength of the first light is in the range of 311 nm to 315 nm.

6. The display panel of claim 1, wherein the wavelength of the second light is in the range of 252 nm to 256 nm, the wavelength of the first light is in the range of 363 nm to 367 nm.

7. A method for manufacturing a display panel, wherein the method comprises the steps of:
   A, irradiating a first alignment material with a first light having a first wavelength to form a first alignment layer on a first surface of a thin film transistor array substrate;
   B, irradiating a second alignment material with a second light having a second wavelength to form a second alignment layer on a first surface of a color filter substrate;
   C, combining and laminating the thin film transistor array substrate with the first alignment layer located and the color filter substrate with the second alignment layer located as a whole part;
   D, disposing a liquid crystal layer between the first surface of the thin film transistor array substrate and the first surface of the color filter substrate;
   wherein the first alignment material is one of a light-induced decomposing reaction alignment material, a light-induced isomerizing reaction alignment material, and a light-induced crosslinking reaction alignment material;
   wherein if the first alignment material is the light-induced decomposing reaction alignment material, the second alignment material is selected from the light-induced isomerizing reaction alignment material and the light-induced crosslinking reaction alignment material; if the first alignment material is the light-induced isomerizing reaction alignment material, the second alignment material is selected from the light-induced decomposing reaction alignment material and the light-induced crosslinking reaction alignment material; and if the first alignment material is the light-induced crosslinking reaction alignment material, the second alignment material is selected from the light-induced decomposing reaction alignment material and the light-induced isomerizing reaction alignment material;
   wherein irradiation of a first light having a first wavelength selectively alters a first portion of the first alignment layer that is parallel to a polarization direction of the first light from being parallel to the polarization direction of the first light to being perpendicular to the polarization direction of the first light, while a second portion of the first alignment material that is perpendicular to the polarization direction is not changed; and
   wherein irradiation of a second light having a second wavelength selectively alters a first portion of the second alignment layer that is parallel to a polarization direction of the second light from being parallel to the polarization direction of the second light to being perpendicular to the polarization direction of the second light, while a second portion of the second alignment material that is perpendicular to the polarization direction is not changed.

8. The method of manufacturing the display panel of claim 7, wherein the wavelength of the first light is equal to the wavelength of the second light.

9. The method of manufacturing the display panel of claim 7, wherein the wavelength of the first light is in the range of 252 nm to 256 nm; the wavelength of the second light is in the range of 311 nm to 315 nm.

10. The method of manufacturing the display panel of claim 7, wherein the wavelength of the first light is in the range of 252 nm to 256 nm; the wavelength of the second light is in the range of 363 nm to 367 nm.

11. The method of manufacturing the display panel of claim 7, wherein the wavelength of the second light is in the range of 252 nm to 256 nm, the wavelength of the first light is in the range of 311 nm to 315 nm.

12. The method of manufacturing the display panel of claim 7, wherein the wavelength of the second light is in the range of 252 nm to 256 nm, the wavelength of the first light is in the range of 363 nm to 367 nm.

* * * * *